United States Patent
Wu et al.

(10) Patent No.: US 10,484,265 B2
(45) Date of Patent: Nov. 19, 2019

(54) DYNAMIC UPDATE OF VIRTUAL NETWORK TOPOLOGY

(71) Applicant: AT&T Intellectual Property I, L.P., Atlanta, GA (US)

(72) Inventors: Tsong-Ho Wu, Englishtown, NJ (US); Wen-Jui Li, Bridgewater, NJ (US); Wai Lai, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/499,452

(22) Filed: Apr. 27, 2017

(65) Prior Publication Data
US 2018/0316594 A1 Nov. 1, 2018

(51) Int. Cl.
*H04L 12/751* (2013.01)
*H04L 12/24* (2006.01)
*H04L 12/715* (2013.01)

(52) U.S. Cl.
CPC .............. *H04L 45/02* (2013.01); *H04L 41/12* (2013.01); *H04L 45/64* (2013.01)

(58) Field of Classification Search
CPC ......... H04L 45/02; H04L 41/12; H04L 41/20; H04L 49/70; H04L 69/323
USPC ........................................................ 370/392
See application file for complete search history.

(56) References Cited

U.S. PATENT DOCUMENTS

| | | | |
|---|---|---|---|
| 9,450,817 B1 | 9/2016 | Bahadur et al. | |
| 9,450,823 B2 | 9/2016 | Arora et al. | |
| 9,532,297 B2 | 12/2016 | Huang et al. | |
| 2002/0021671 A1* | 2/2002 | Quinlan | H04L 41/0672 370/242 |
| 2002/0073062 A1* | 6/2002 | Cerami | G06Q 10/087 |
| 2003/0076840 A1* | 4/2003 | Rajagopal | H04L 41/0213 370/395.21 |
| 2003/0084367 A1* | 5/2003 | Suemura | H04J 14/0227 714/4.11 |
| 2009/0037771 A1* | 2/2009 | Morse | H04L 41/0668 714/25 |
| 2014/0310409 A1* | 10/2014 | Ohsuga | G06F 11/3065 709/224 |

(Continued)

FOREIGN PATENT DOCUMENTS

| | | |
|---|---|---|
| EP | 3079302 A1 | 10/2016 |
| WO | WO 2016/039730 A1 | 3/2016 |
| WO | WO 2016/165422 A1 | 10/2016 |

OTHER PUBLICATIONS

Akyildiz et al.; "Research Challenges for Traffic Engineering in Software Defined Networks"; IEEE Network; vol. 30 No. 3; 2016; p. 52-58.

(Continued)

*Primary Examiner* — Stephen J Clawson
(74) *Attorney, Agent, or Firm* — BakerHostetler

(57) ABSTRACT

An IP network topology update system may update IP network topology in near real-time and on-demand with minimum overheads. It identifies likely impact area (e.g., layer 2 or layer 3), objects (e.g., link or node such a device), and timing (e.g., what topology objects located where or when the topology update process should be performed) in the IP Layer 3 network and its underlying SDN Layer 2 network under virtualized networking infrastructure as candidates of impacts for topology update.

18 Claims, 12 Drawing Sheets

(56) References Cited

U.S. PATENT DOCUMENTS

2016/0380807 A1 12/2016 Shevenell et al.
2017/0048110 A1 2/2017 Wu et al.

OTHER PUBLICATIONS

Aguado et al.; "Experimental Demonstration of Policy-based Dynamic End-to-End Provisioning over Multi-Layer Network using SDN"; $42^{nd}$ European Conf. on Optical Communication; 2016; p. 193-195.

* cited by examiner

DYNAMIC UPDATE OF VIRTUAL NETWORK TOPOLOGY

TECHNICAL FIELD

The technical field generally relates to software-defined networks and, more specifically, to systems and methods for virtual networks.

BACKGROUND

Cloud computing is an approach that can be used to allow customers to create and activate new services, as well as to update existing service capabilities on-demand and in near real-time. To accommodate requirements of on-demand service request from customers, software-defined networking ("SDN") is used to allow network infrastructure as a network resource pool (network-on-demand) for IP layer network applications to adapt to user service demand through on-demand network resource allocation and reallocation via hardware programmability on virtualized network components. Thus, SDN can obviate the need for demand to be adapted to constraints of hardware-oriented IP network infrastructure.

One difficulty in network operations that may arise with SDN networks is the operation of on-demand network resource allocation or reallocation that requires knowledge of the network topology at the time needed. A network (e.g., IP) topology is a set of network resource components (e.g., routers or virtual routers) and their linking relationships supporting given IP Layer 3 applications such as Virtual Private Network (VPN). A SDN network may have an underlying network infrastructure of IP networks. A SDN network topology may be a set of Link Layer switches (also called Layer 2 switches, for example Ethernet switches) and links connecting Layer 2 switches. A Layer 3 topology may be a logical topology, which is built on Layer 2 physical network topology. Because SDN can enable almost instantaneous changes to the virtual network configuration, one may have difficulty tracking and discovering the connectivity relationship between virtualized network functions (which may be related to IP routing), virtual machines (VMs), and host hardware server (which may host the IP network node) at the time needed. As such, it may be difficult to identify available and utilized elements or connectivity information relating to the virtual network topology at Layer 3 or Layer 2 at a given time.

SUMMARY

An IP network topology update system may update IP network topology in near real-time and on-demand with minimum overheads. It identifies likely impact area (e.g., layer 2 or layer 3), objects (e.g., link or node such a device), and timing (e.g., what topology objects located where or when the topology update process should be performed) in the IP Layer 3 network and its underlying SDN Layer 2 network under virtualized networking infrastructure as candidates of impacts for topology update.

In an example, an apparatus may include a processor and a memory coupled with the processor that effectuates operations. The operations may include obtaining a first alert, the first alert comprising information affecting a virtual topology; determining that the first alert is a parent event; based on the determining that the first alert is a parent event, determining an object associated with the parent event; based on the determining of the object associated with the parent event, obtaining other events that are associated with the object; and based on the events obtained that are associated with a similar object as with the first alert, determining an impact area that the parent event affects.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
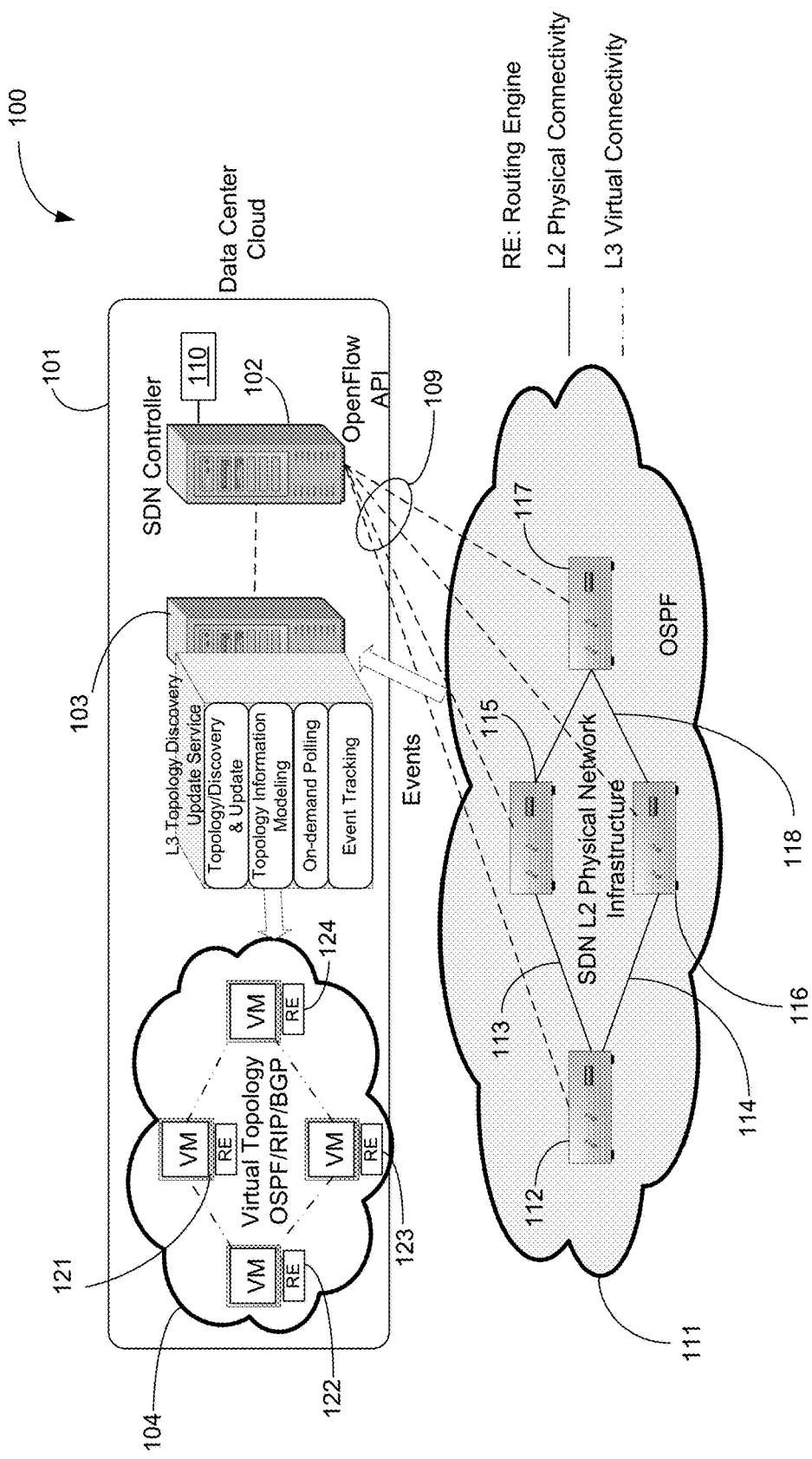
FIG. 1 illustrates an exemplary system for network topology updating.

FIG. 1 illustrates an exemplary system for network topology updating. System 100 includes data center cloud 101 and a SDN layer 2 (L2) physical network (physical network 111). Physical network 111 includes multiple programmable switches (SWs), such as switch 112, switch 116, switch 115, and switch 117. Switch 112 may be communicatively connected with switch 115 and switch 116 via physical link 113 and physical link 114, respectively. Although switches (which may be layer 3 switches) are shown in physical layer network 111 it is contemplated that other devices, such as routers may be included. Data center cloud 101 may include an SDN controller 102 that is communicatively connected to topology manager 103. SDN controller 102 may have signaling (i.e., control) connections 109 with the switches of physical network 111. Information from these signaling connections may be used by topology manager 103 to create virtual topology 104. Virtual topology 104 may include virtual machines (VMs) and virtual routers (vRs), such as vR 121, vR 122, and vR 123, or vR 124 connected by layer 3 (L3) virtual connectivity. Topology manager 103 may display or create virtual topology 104 (or a physical typology) based on methods and systems disclosed herein.

Figure 2:
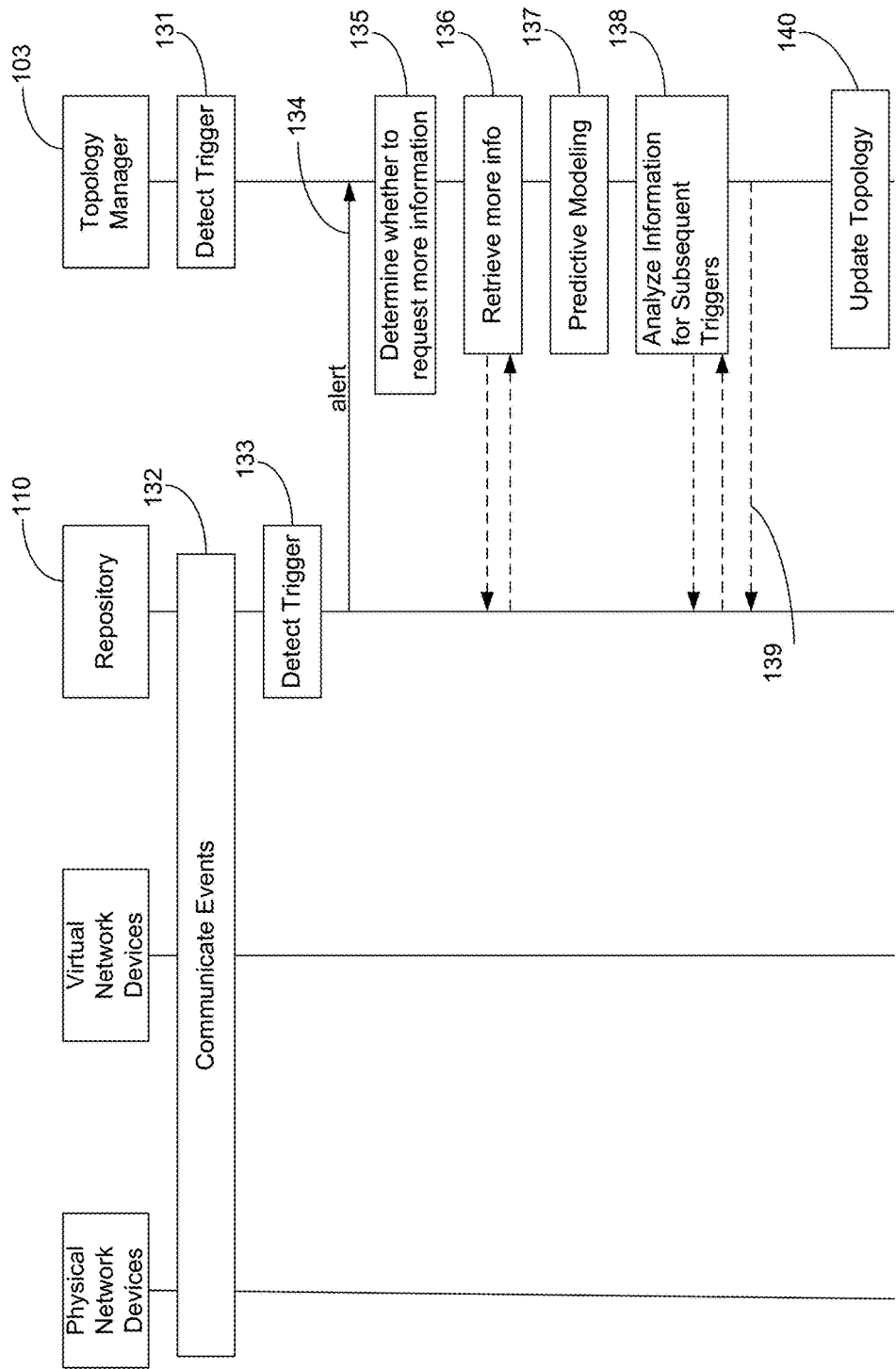
FIG. 2 illustrates an exemplary method for dynamic virtual network topology update.

FIG. 2 illustrates an exemplary method for dynamic virtual network topology update. At block 131, virtual network topology 104 is obtained. In an exemplary scenario, at the initial stage, the topology manager 103 may not have any configurations (e.g., there are no virtual machines to run a routing engine). Upon detection of new switches (e.g., switch 112, switch 115, etc. . . . ) and links (e.g., physical link 114), at Layer 2 SDN network corresponding L3 virtual machines (e.g., VM 121, VM 122, etc. . . . ) may be created and virtual links between the virtual machines (see virtual topology 104 of FIG. 1). A separate network manager server (not shown) may be used to generate the L3 virtual machines. Link Layer Discovery Protocol (LLDP) is an example standard protocol that may be used to discover and map links associated with physical network 111 at L2 SDN network to virtual machines in L3 IP virtual network topology 104. The creation of L3 network topology based on discovered L2 network topology depends on the design at L3 IP later. This example shows a 1:1 design, which one L2 switch at SDN network corresponds to one virtual router at Layer 3, and the link between two L2 switches corresponds to a link between two virtual routers at Layer 3. After L3 virtual topology 104 is discovered, L3 routing paths may be computed using OSPF or another routing protocol. The L3 routing paths may map to L2 forwarding paths associated with physical network 111. Table 1 provides exemplary L2 forwarding paths and L3 routing paths for FIG. 1.

TABLE 1

| L2 forwarding paths: |
| --- |
| SW112 <-> SW116; SW116 <-> SW117; SW112 <-> SW116 <-> SW117; |
| L3 routing paths: |
| vR122 <-> vR123; vR123 <-> vR124; vR122 <-> vR123 <-> vR124 |

At step 132, events may be collected in repository 110 (e.g., event collector). Repository 110 may be a standalone device or located within SDN controller 102, topology manager 103, or another network device. As shown in FIG. 1, SDN controller 102 may be communicatively connected with the devices of physical network 111. SDN controller 102 may receive information, such as events, from each switch and pass it along to topology manager 103. Although many different events associated with L2 or L3 may be collected, a subset of events (e.g., event types or event class) may be defined to trigger particular subsequent actions. Table 2 provides exemplary SDN event classes and types that may be defined to trigger the particular actions (e.g., a topology update in a table or on a display). SDN event types that are monitored may be events reflecting node or connectivity status changes in L2 physical network infrastructure, L3 physical network infrastructure, L3 virtual execution environment in the cloud, or the like that may trigger L3 topology update operations.

TABLE 2

| Event Class | Event Types |
| --- | --- |
| Virtual Application Status Change Events (at Layer 3) | VM creation/update/delete; Loss of heartbeat (VM), VM power on/power off, vRouter (vR) creation/modification/removal; vRouter performance degrade (TCA Alarm), virtual interface fails, |
| Hardware Status Change Events (at Layer 2) | SW creation/remove; SW power on/power-off; Connection loss, physical interface fails |

Figure 3:
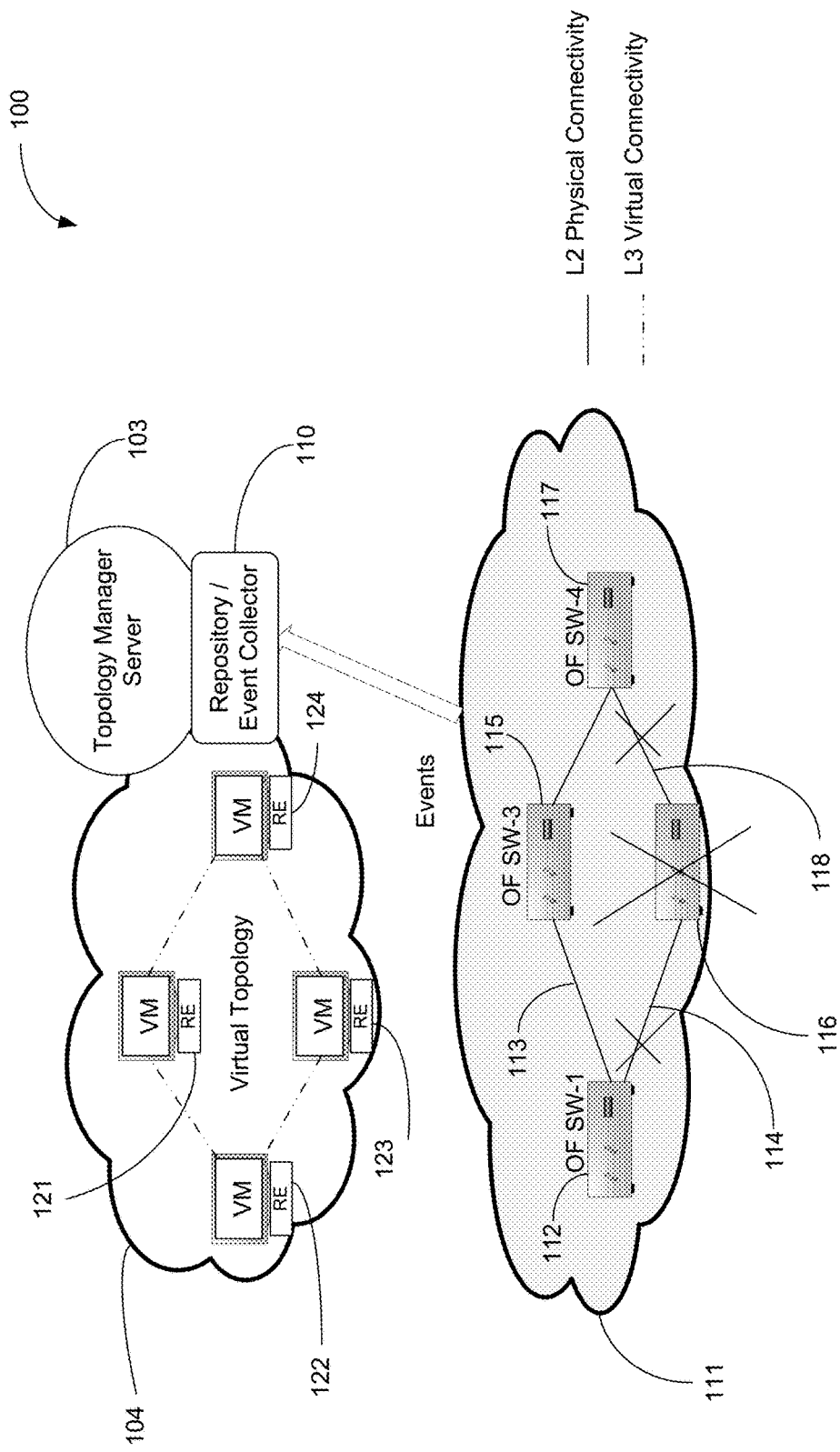
FIG. 3 illustrates an exemplary failure that may cause one or more events to be collected.

With continued reference to FIG. 2, at step 133, a detected event (e.g., link down) may trigger repository 110 to alert topology manager 103. FIG. 3 illustrates an exemplary failure that may cause one or more events to be collected by repository 110 and subsequently trigger alerting topology manager 103. In FIG. 3, there may be a physical interface failure for switch 116 that may impact physical link 114 and physical link 118. In this scenario, an interface failure is monitored by repository 110 and may trigger an alert to be sent to topology manager 103 (step 134). For example, the alert may include 1) a positive or negative indication of an occurrence of a SDN event class affecting virtual topology 104; or 2) an identifier for the SDN event class affecting virtual topology 104. Table 3 is an example of information that may be included in the alert of step 134.

TABLE 3

| ALARM_TIMESTAMP | ALARM_SOURCE | ALARM_TEXT |
| --- | --- | --- |
| Fri Jan 20 08:51:23 2017 (1484902283) | reanv401me6.elsan.att.net:Traps | MPLS LDP Session Down - State: nonexistent, Reason: peerSentNotification, Neighbor Interface: 536 |

At step 135, topology manager 103 may determine, based on one or more factors (e.g., information in the alert or usage of topology manager), when or whether to request additional information from repository 110 with regard to the alert. The factors that may be considered by topology manger 103 may include network traffic load, processor load of topology manager 103, or priority of the event class at L2 or L3 in view of the other factors, among other things.

At step 136, topology manager 103 may determine (e.g., based on the factors or the like discussed herein) to request more information for the eventual topology update of step 140. For example, when an alert of a physical interface failure associated with SW 116 is detected (e.g., via trap), it may trigger on-demand event polling by topology manager 103 to repository 110 to retrieve events types defined in Table 2 (e.g., event types affecting L2 or L3 node/connectivity status or link down events associated with L2 or L3 links). This triggered polling may provide for more frequent polling than was done before it was triggered. This triggered polling may allow for reduced unnecessary polling compared to conventional systems and therefore lead to reduced network load and more efficient use of topology manager 103 or other devices. In an example, events polled from repository 110 may include the events E2-E6 as shown in Table 4. Table 4 provides example events (E2-E6) polled from repository 110 after detecting the E1 event (interface failure from SW 116). The events of E2-E6 may be limited by time frame (e.g., 2:04 P.M-2:05 P.M.). As discussed herein, step 136 may not be needed based on the information within the alert received at step 134. A topology manager 103 may not request more information at step 136 because the alert of step 134 may be the second or third alert and the first or second alert may be sufficient to diagnose the issue and update the topology.

TABLE 4

E1 = interface failure from SW 116
E2 = link down from SW 116
E3 = link down from SW 117
(e.g., cannot travel to SW 112 via SW 116)

TABLE 4-continued

E4 = virtual link down from vR 123
E5 = virtual link down from vR 122
E6 = virtual link down from vR 124

Figure 4A:
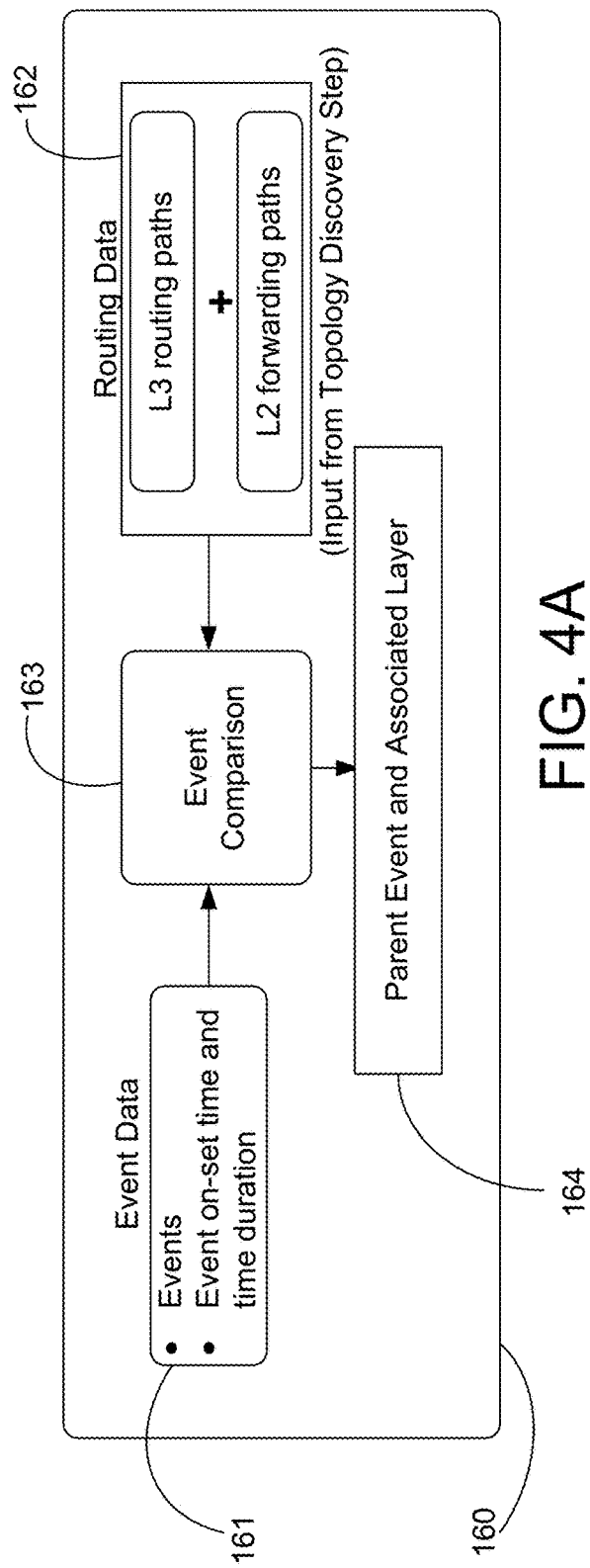
FIG. 4A illustrates an exemplary method for predictive analysis modeling.
Figure 4B:
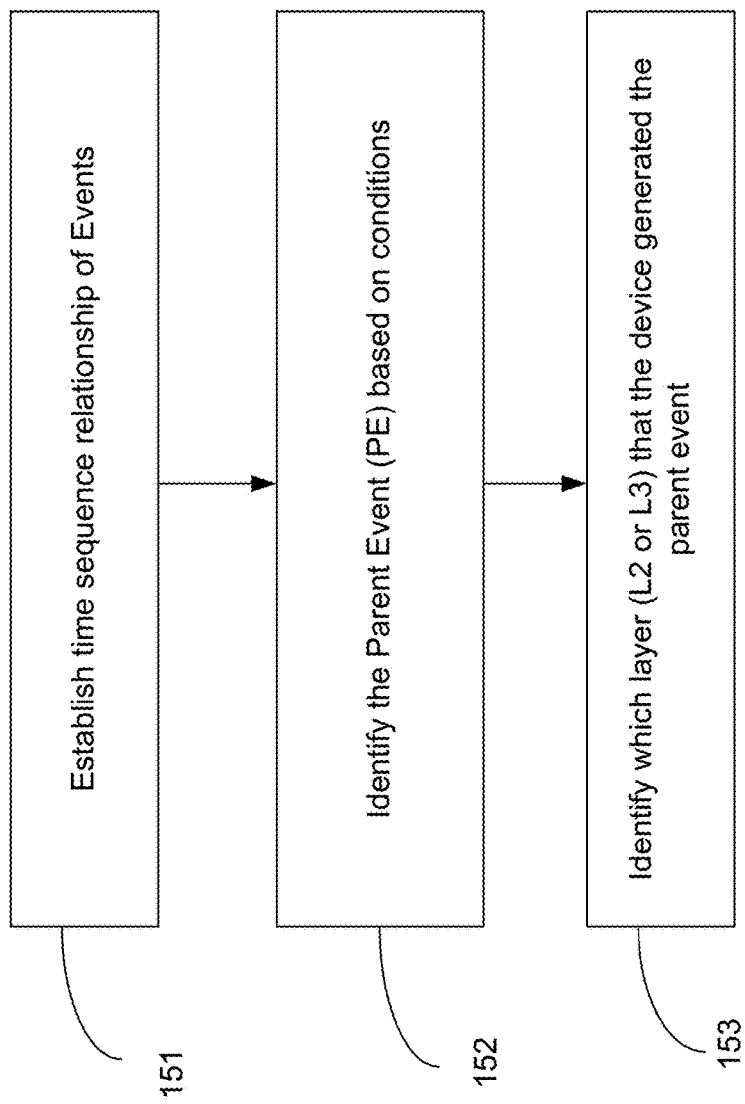
FIG. 4B illustrates an exemplary method for predictive analytics modeling.

At step 137, topology manager 103 may determine the likely scenario (e.g., a particular L2 outage or L3 outage) and therefore topology update based on results of predictive analytics modeling, as further discussed regarding FIG. 4B. Step 138 and step 139 may be used to assist in implementing a more efficient processing of information at one or more previous steps (e.g., steps 133, step 134, or step 135) for a subsequent detected event. For example, at step 138, more information (e.g., error events) may be requested over a larger or different time frame. Step 138 may be triggered based on a historical pattern of events or topology updates. At step 139, based on this requested information, a different event type or event class may be requested by topology manager 103 to be added as a trigger in repository 110 for a subsequent situation. It is also contemplated that an event type or class may be requested to be removed as a trigger in repository 110, based on the requested information of step 138. With reference to step 138 and step 139, in an example, after having a particular type of topology update in a particular time frame, more information (e.g., more detailed errors that may go beyond what is in table 2) may be requested in order to determine errors that more directly indicate what topology update is needed. The error that indicates the more direct topology update (e.g., MPLS LDP Session Down) may be sent to repository 110 as a trigger for step 134 or step 136.

Figure 5:
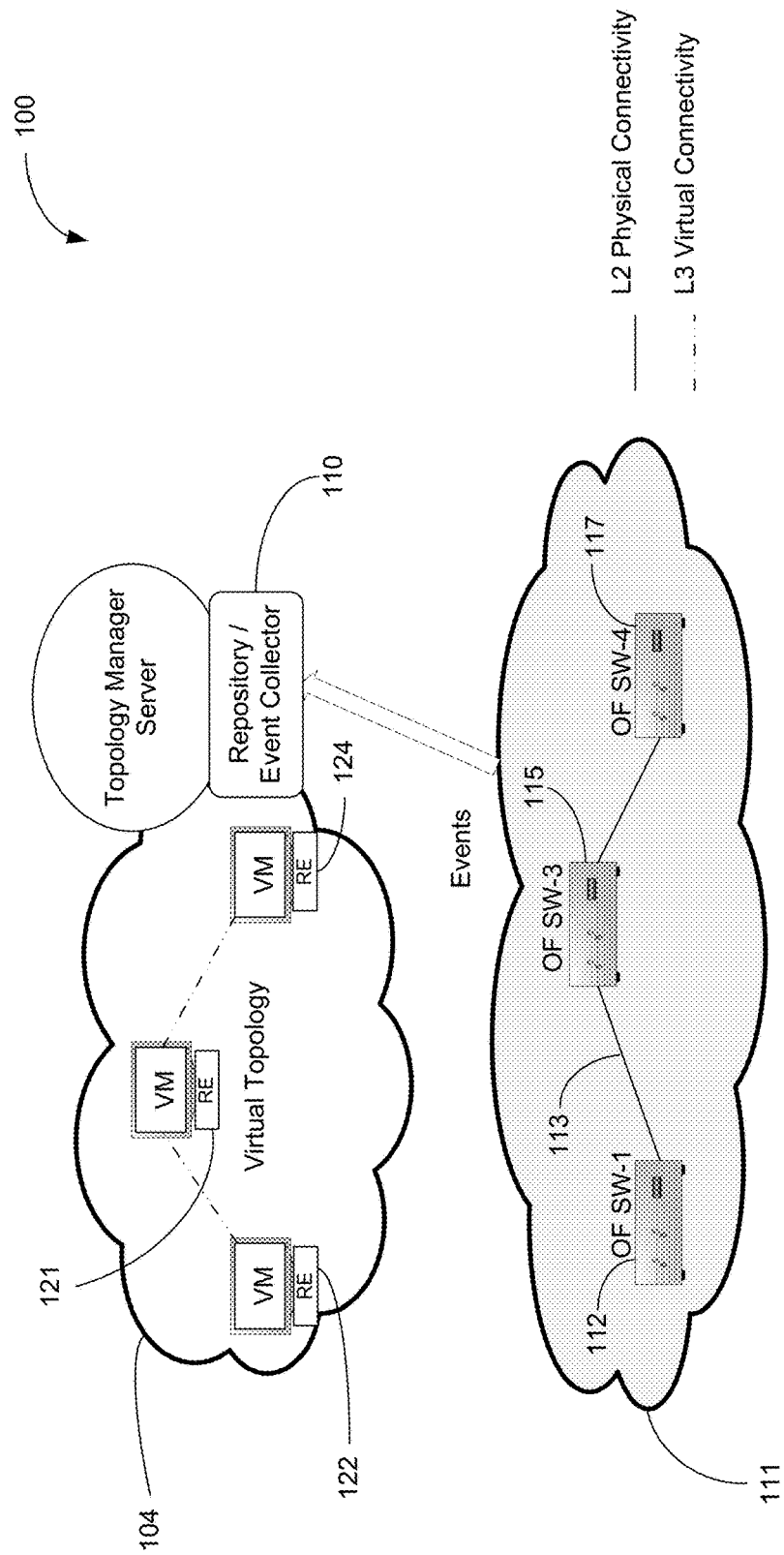
FIG. 5 illustrates an exemplary updated topology associated with a failure in FIG. 3.

At step 140, topology manager 103, based on one or more of steps 134-137, generates an updated topology as shown in FIG. 5. A graphical representation of the updated topology may be shown on the display of a computing device (e.g., display unit 512). Table 5 provides exemplary updated L2 forwarding and L3 routing paths. With reference to the example provided with regard to FIG. 3, since the impacted layer is at L2, the topology update may be performed at both L2 and L3 (as L3 is generated from L2 connectivity). Topology update process may repeat the topology discovery process (step 131) without managed objects of SW 116 (e.g., SW 116, physical link 114, physical link 118, vR124 and corresponding virtual links). It is understood that the virtual topology may not be one-to-one with the physical topology. For example, vR 124 may remain with one of its links even without SW 116. If the impact occurs at L3, it will not affect connectivity in L2. Thus the topology update may be performed only at L3.

TABLE 5

L2 forwarding paths:

SW112 <-> SW115 <-> SW117; SW112<->SW115; SW115 <-> SW117;
L3 routing paths:

vR122 <-> vR121 <-> vR124; vR122<->vR121; vR121 <-> vR124

FIG. 4A and FIG. 4B illustrate a topology update correlation information model and execution steps, respectively, for predictive analytics modeling, in which topology manager 103 identifies parent event and its located layer (e.g., L2 or L3) from events reflecting connectivity status change. In FIG. 4A, L3 Predictive correlation information modeling service for Topology Update identifies candidate area and objects as well as the layer (L2 or L3) for topology update operations via identification of parent (the term "source" may be used interchangeably with "parent") event and its located layer (L2 or L3) from events reflecting connectivity status change. Topology Update Correlation Information Model may include event dataset, routing dataset (from Topology Discovery module) and event correlator with output as parent (source) events and associated layers (L2 or L3). FIG. 4A illustrates an exemplary method flow 160 for predictive analysis modeling. There may be event data block 161. Event data may include particular events (e.g., event types or event class). There may be routing data block 162, which may include L3 routing paths or L2 forwarding paths. Event data 161 and routing data 162 may be correlated (or otherwise compared) at comparison block 163 to output parent event and associated layer block 164. As discussed herein, the information of block 164 may be subsequently used to generate an updated topology (e.g., FIG. 5).

Figure 6:
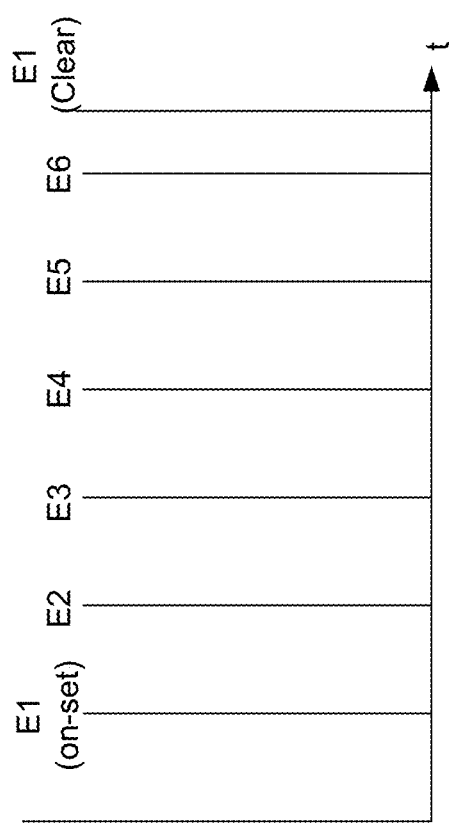
FIG. 6 illustrates an exemplary timing sequence.

FIG. 4B illustrates an exemplary method for implementing topology update correlation information model. At step 151, topology manager 103 may establish a time sequence relationship among events to be analyzed, where timing factors may include the event starting time or the event duration (e.g., T=Clear Time−Onset Time) within the same device or a similarly situated device (e.g., similar network with similar load). In an example, with reference to FIG. 3 and Table 4, there may be six alarms (E1 to E6). Timing sequence of E1-E6 is shown in FIG. 6. This example sequence shows that, as a result of physical link 118 being down, both SW 116 and SW 117 generated their corresponding link down events, E2 and E3. This condition affected the operations of virtual topology 104, leading to the generation of virtual link down events E4, E5, and E6. Sometime later, when physical link 118 came up, corresponding link up events for both physical network 111 and virtual topology 104 would be generated. Depending on the timing of physical link 118 coming up, there may be different sequences of link up events being generated. For example, if physical link 118 came up momentarily, physical network 111 link up events would be generated followed by virtual topology 104 link up events. On the other hand, if physical link 118 took quite some time to come up and OSPF rerouting occurred soon after virtual link down, then virtual topology 104 link up events would be generated prior to the generation of physical network 111 link up events. It should be understood that by telecom device management design, the duration of clearing time and the onset time is usually in "minutes" range (for example for link down). An event whose clearing exceeds this design range may be considered as an invalid event (for processing) and discarded.

At step 152, topology manager 103 may identify parent event (PE) when conditions are met. The conditions may include: 1) a first event during the event time duration (t); and 2) the source device associated with the event within the forwarding (L2) or routing paths (L3) of devices generated other events being analyzed (see also FIG. 4A). Onset and clear alarms from the same device are marked with the same alarm ID so that they can be correlated. Hence, a parent event may be identified as the first event generated and received by repository 110 during the event time duration T computed by pairing the onset and clear alarms with the same alarm ID from the same device. In another example, for any two events X and Y, if the occurrence of event X will automatically trigger event Y, then event X is the parent event of event Y. The parent event is sometimes referred to as a source event. In the example, with reference to FIG. 3, as shown in FIG. 6, E1 is the first alarm detected among six alarms, in which E1 is the event associated with a physical interface failure of SW 116. Here, the source alarm may be determined to be E1 from SW 116 located at L2. In addition, the interface of SW 116 may be used by the other events whose devices' forwarding path (L2) (e.g., E2 and E3) and routing path (L3) (e.g., E4, E5, and E6). At step 153, topology manager 103 may identify which layer (L2 or L3) of the device that generated the parent event is located based on the parent event of step 152 or time sequence relationship.

Figure 7:
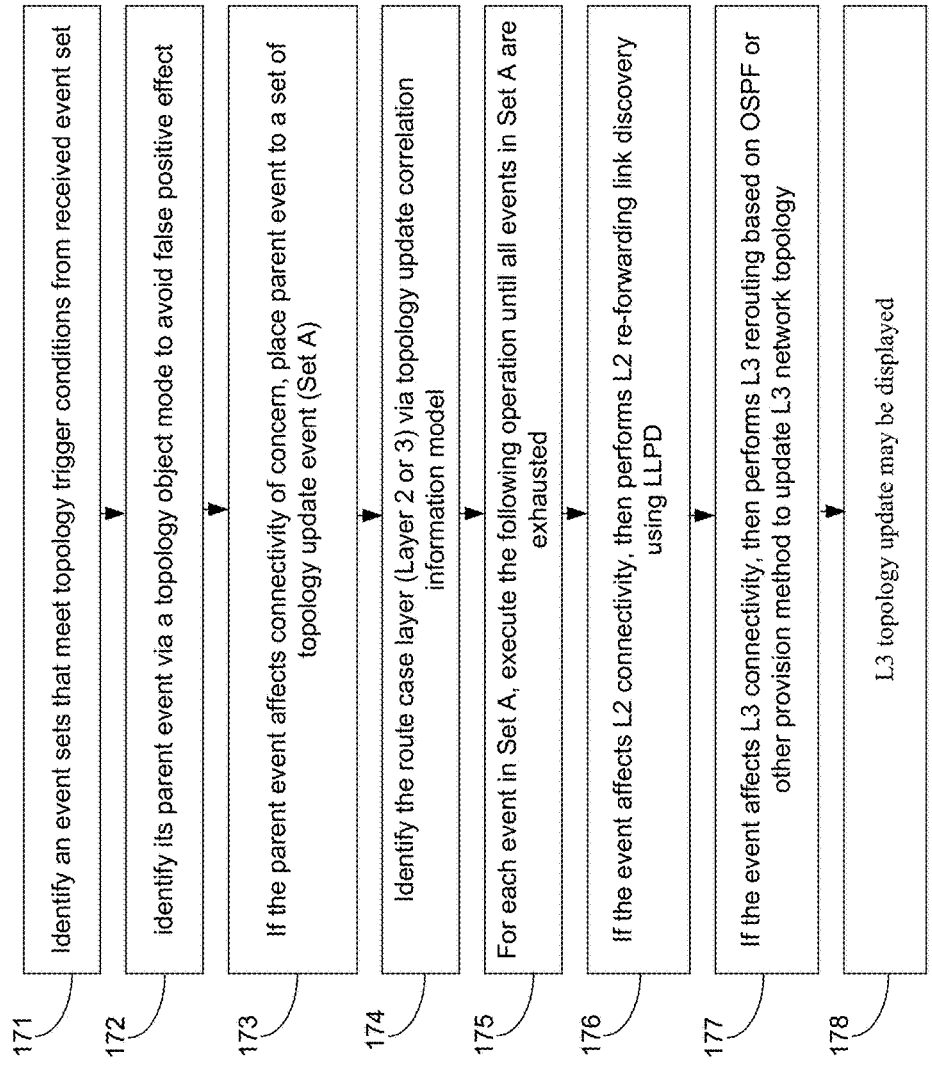
FIG. 7 illustrates an exemplary set of system components for dynamic virtual network topology update.

FIG. 7 illustrates an exemplary method flow associated with FIG. 2 for on dynamic update of virtual network topology. At step 171, identify an event sets that meet topology trigger conditions from received event set. At step 172, for each event received that affects physical L2 or virtual L3 connectivity, identify its parent event via a topology object mode to avoid false positive effect. At step 173, if the parent event affects connectivity of concern, place parent event to a set of topology update event (Set A); identify a set of nodes or links associated with Set A, which will serve as candidates to perform local permutation of topology update via procedure of step 175. At step 174, identify the route case layer (Layer 2 or 3) via topology update correlation information model. At step 175, for each event in Set A, execute the following operation until the events in Set A are exhausted. At step 176, if the event affects L2 connectivity, then perform L2 re-forwarding link discovery using LLPD, and new link information is sent to SDN controller 102 to update L3 topology (e.g., 1:1 operation model). At step 177, if the event affects L3 connectivity, then perform L3 rerouting based on OSPF or other provision method to update L3 network topology; and then for each impacted virtual router, send OpenFlow message (for example) to update L2 of SW connectivity via LLDP. At step 178, L3 topology update may be displayed, distributed, or stored for future retrieval by an application.

Topology manager 103 may be a standalone device (e.g., server) or integrated into another device, such as SDN controller 102. The switches of physical network 111 may use OpenFlow to assist in their management. Internet Protocol (IP) layer, Layer 3 and L3 are used interchangeably herein.

The following aspects may be considered herein: 1) Identify event types to be monitored that would trigger topology update operations; 2) Use trigger-based on-demand event data polling for predictive analytics to reduce network management traffic load; 3) Use predictive analytics model and algorithms to automate data model processing and identify potential impact areas (WHERE), objects (WHAT) and timing (WHEN) for effective topology update operations to minimize topology update time with lesser network management traffic load; 4) Layer-dependent topology update algorithm and model may reduce probability of false positives for topology update; or 5) An integrated workflow of near real-time event monitoring and predictive topology update for effective L3 topology update service in cloud SDN environment. The integrated workflow may include a L3 topology discover service (Leverage an open source project prior-art), SDN Event Type tracking service, on-demand trigger-based event poll service, L3 predictive correlation information modeling service, or L3 topology update service. It should be understood that real-time event data may be used as the dynamic update of network topology for on demand (e.g., when the update condition is triggered).

Figure 8:
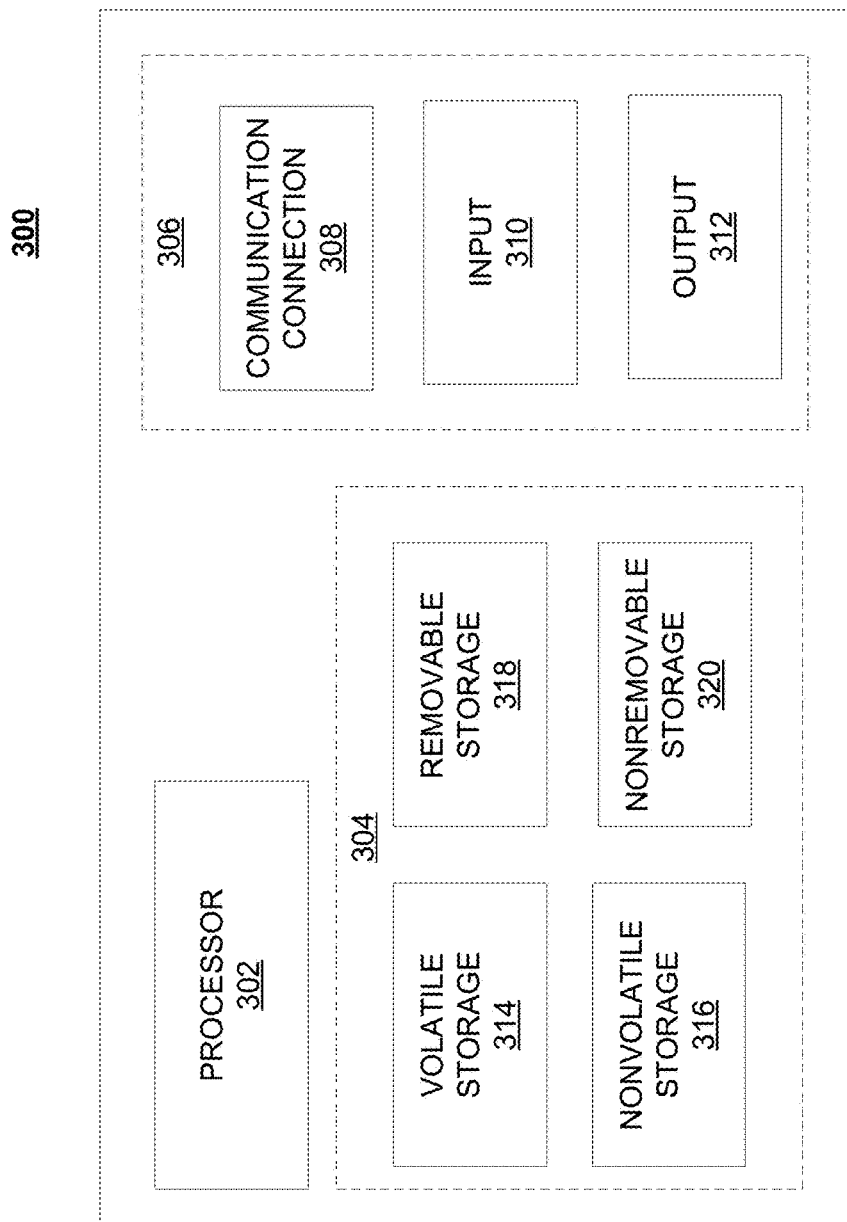
FIG. 8 illustrates a schematic of an exemplary network device.

FIG. 8 is a block diagram of network device 300 that may be connected to or comprise a component of physical network 111 or data center cloud 101. Network device 300 may comprise hardware or a combination of hardware and software. The functionality to facilitate telecommunications via a telecommunications network may reside in one or combination of network devices 300. Network device 300 depicted in FIG. 8 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 8 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 8) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media.

By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 9:
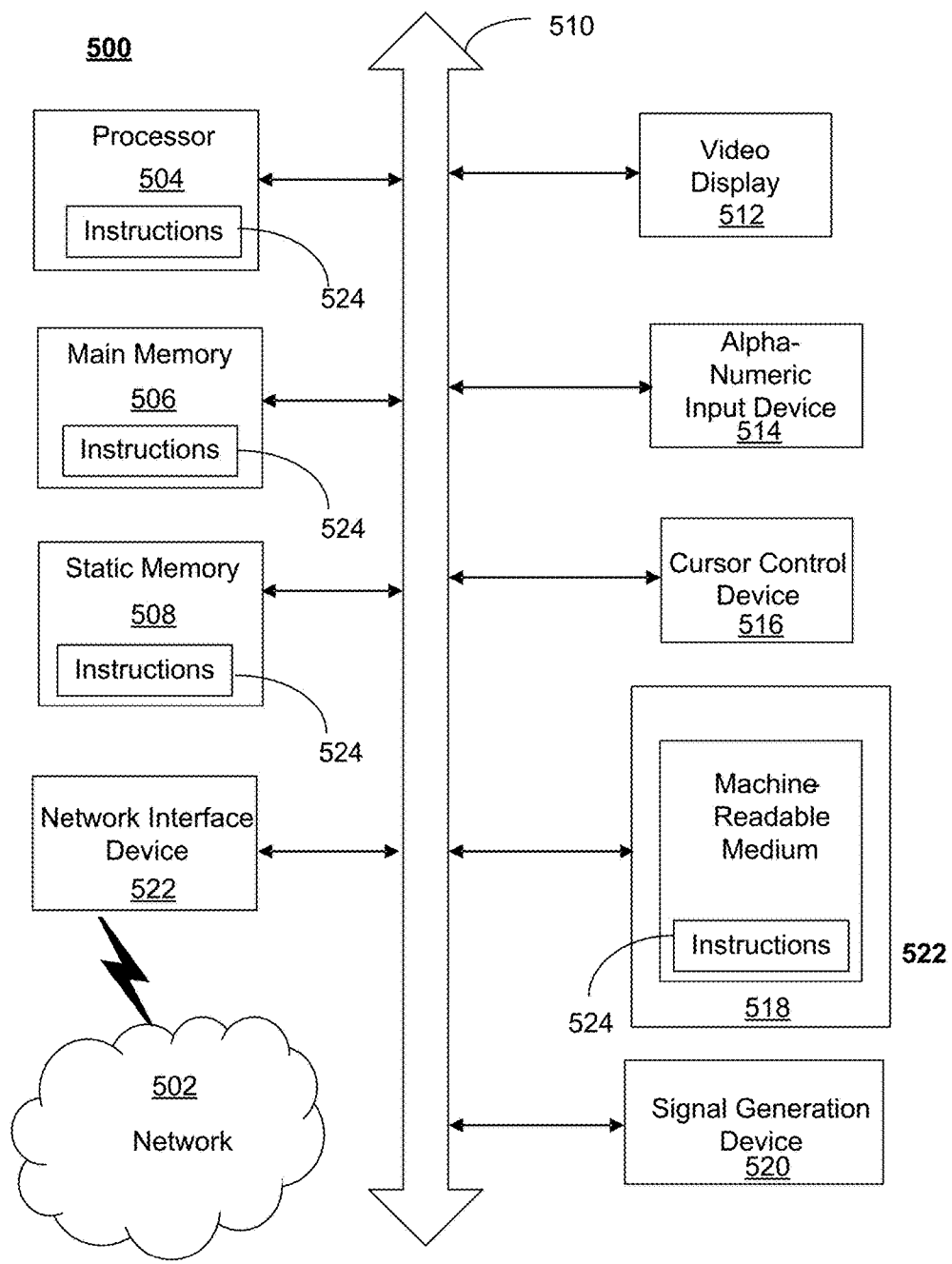
FIG. 9 illustrates an exemplary communication system that provides wireless telecommunication services over wireless communication networks.

FIG. 9 depicts an exemplary diagrammatic representation of a machine in the form of a computer system 500 within which a set of instructions, when executed, may cause the machine to perform any one or more of the methods described above. One or more instances of the machine can operate, for example, as processor 302, SW 116, topology manager 103, SDN controller 1012, and other devices of FIG. 1 and FIG. ZZ2. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 10A:
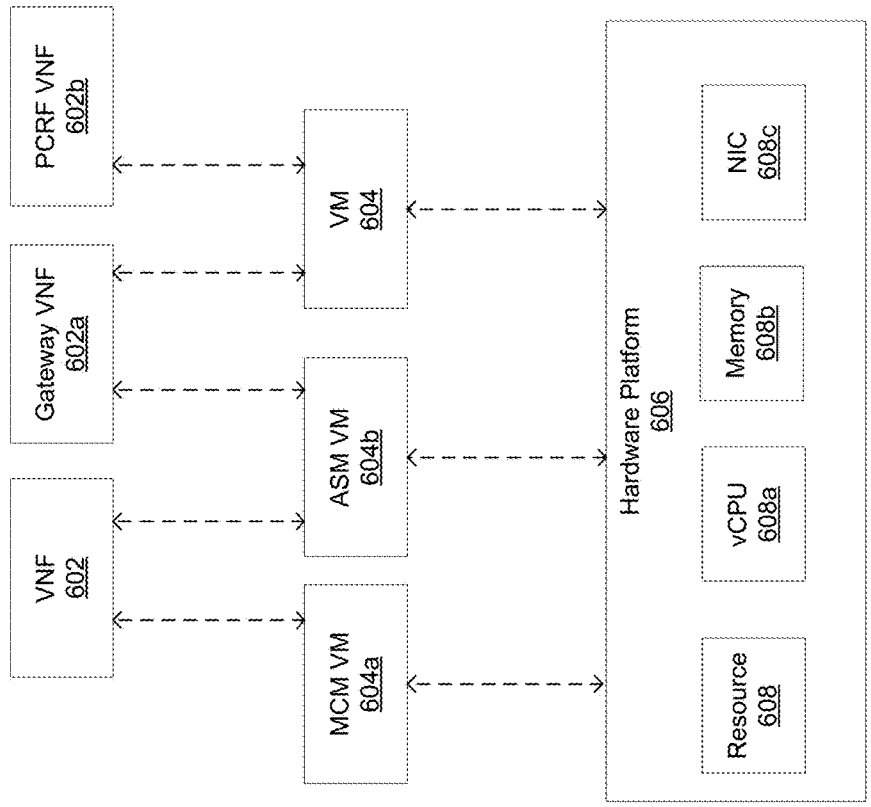
FIG. 10A is a representation of an exemplary network.

FIG. 10A is a representation of an exemplary network 600. Network 600 (e.g., physical network 111) may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 10A illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 10A illustrates a MCM VM 604a, an ASM VM 604b, and a DEP VM 604c. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 10B:
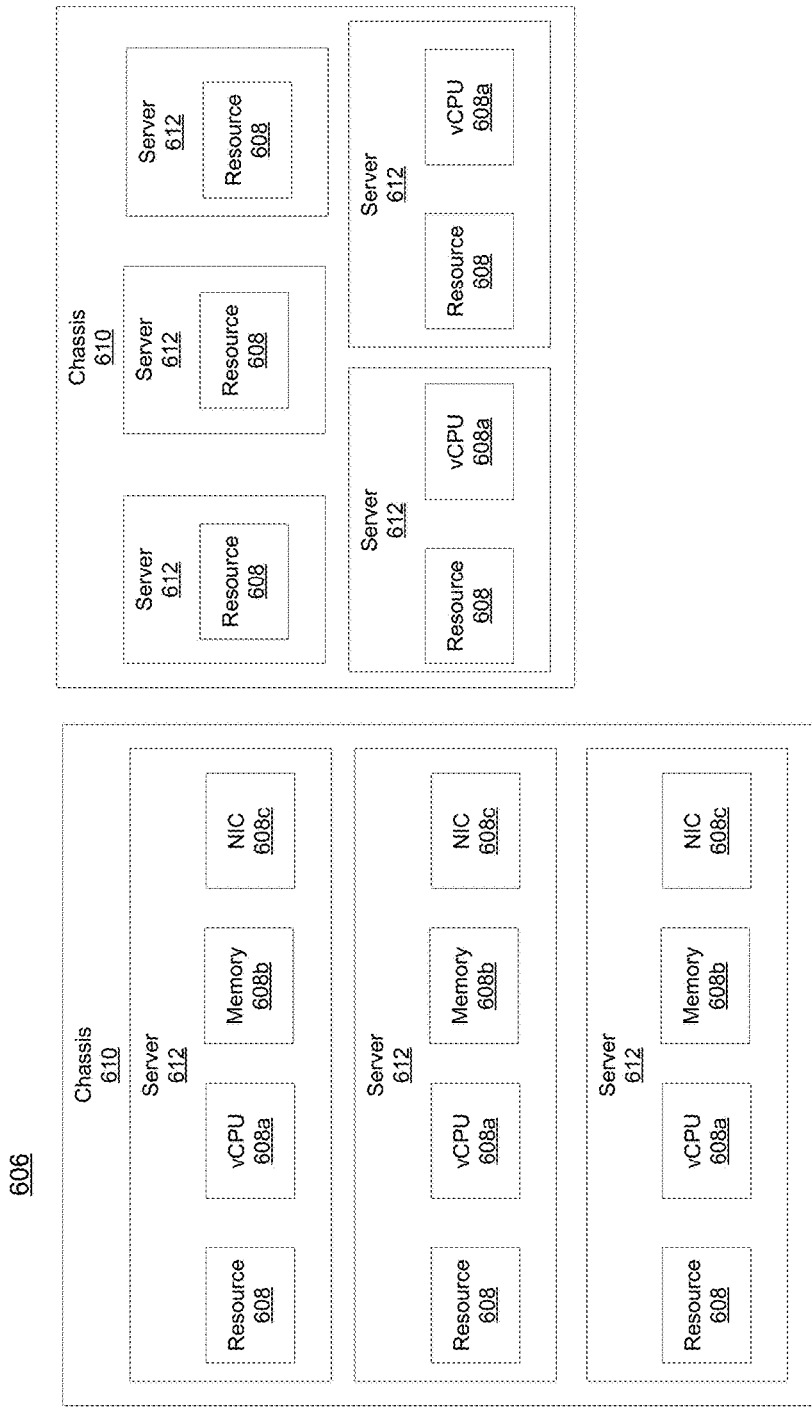
FIG. 10B is a representation of an exemplary hardware platform for a network.

While FIG. 10A illustrates resources 608 as collectively contained in hardware platform 606, the configuration of hardware platform 606 may isolate, for example, certain memory 608c from other memory 608c. FIG. 10B provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 10B illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a may be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (For this example, assume that no affinity or anti-affinity rules restrict whether VMs 604 for PCRF VNF 602b may or must be instantiated on the same or different server 612 than VMs 604 for gateway VNF 602a.) In this example, each of two servers 612 may have sufficient resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management. QoS, load balancing, etc., across many wireless technologies, e.g. LIE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which alerts can be processed and managed for topology updates have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—dynamic virtual network topology update—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. An apparatus comprising:
   a processor; and
   a memory coupled with the processor, the memory comprising executable instructions stored thereon that when executed by the processor cause the processor to effectuate operations comprising:
   obtaining an alert, the alert comprising information affecting a virtual topology;
   determining that the alert is a parent event during a time duration, the time duration computed based on a pairing of a time of an onset alarm and a time of a clear alarm associated with a same alarm identifier from a same device;
   based on the determining that the alert is a parent event, determining an object associated with the parent event;
   obtaining other parent events that are associated with the object;

based on the other parent events that are associated with the object, determining an impact area that the parent event affects; and based on the determined impact area, performing a topology update for the impact area.

2. The apparatus of claim 1, the operations further comprising:

providing instructions to display the topology update on a display of a device.

3. The apparatus of claim 1, wherein the impact area comprises a layer 2 area or a layer 3 area.

4. The apparatus of claim 1, wherein the object comprises a virtual network device.

5. The apparatus of claim 1, wherein the object comprises a physical network device.

6. The apparatus of claim 1, wherein the object comprises a physical link.

7. The apparatus of claim 1, wherein the object comprises a virtual link.

8. A method comprising:

obtaining, by a server, an alert, the alert comprising information affecting a virtual topology;

determining, by the server, that the alert is a parent event during a time duration, the time duration computed based on a pairing of a time of an onset alarm and a time of a clear alarm associated with a same alarm identifier from a same device;

based on the determining that the alert is a parent event, determining, by the server, an object associated with the parent event;

obtaining, by the server, other events that are associated with the object;

based on the other events that are associated with the object, determining, by the server, an impact area that the parent event affects; and based on the determined impact area, performing a topology update for the impact area.

9. The method of claim 8, further comprising:

displaying the topology update on a display of a device.

10. The method of claim 8, wherein the impact area comprises a layer 2 area or a layer 3 area.

11. The method of claim 8, wherein the object comprises a virtual network device.

12. The method of claim 8, wherein the object comprises a physical network device.

13. The method of claim 8, wherein the object comprises a physical link.

14. The method of claim 8, wherein the object comprises a virtual link.

15. A non-transitory computer readable storage medium storing computer executable instructions that when executed by a computing device cause said computing device to effectuate operations comprising:

obtaining an alert, the alert comprising information affecting a virtual topology;

determining that the alert is a parent event during a time duration, the time duration computed based on a pairing of a time of an onset alarm and a time of a clear alarm associated with a same alarm identifier from a same device;

based on the determining that the alert is a parent event, determining an object associated with the parent event;

obtaining other events that are associated with the object;

based on the other events that are associated with the object, determining an impact area that the parent event affects; and based on the determined impact area, performing a topology update for the impact area.

16. The computer readable storage medium of claim 15, the operations further comprising:

displaying the topology update on a display of a device, wherein the topology update comprises a layer 2 topology or a layer 3 topology.

17. The computer readable storage medium of claim 15, wherein the impact area comprises a layer 2 area or a layer 3 area.

18. The computer readable storage medium of claim 15, wherein the object comprises a virtual network device.

* * * * *